March 22, 1938.    O. F. COMPTON    2,111,755
BRAKE
Filed Dec. 29, 1936    2 Sheets-Sheet 1

Inventor
Otis F. Compton
By Clarence A O'Brien
Hyman Berman
Attorneys

March 22, 1938. O. F. COMPTON 2,111,755
BRAKE
Filed Dec. 29, 1936 2 Sheets-Sheet 2
Fig. 2.
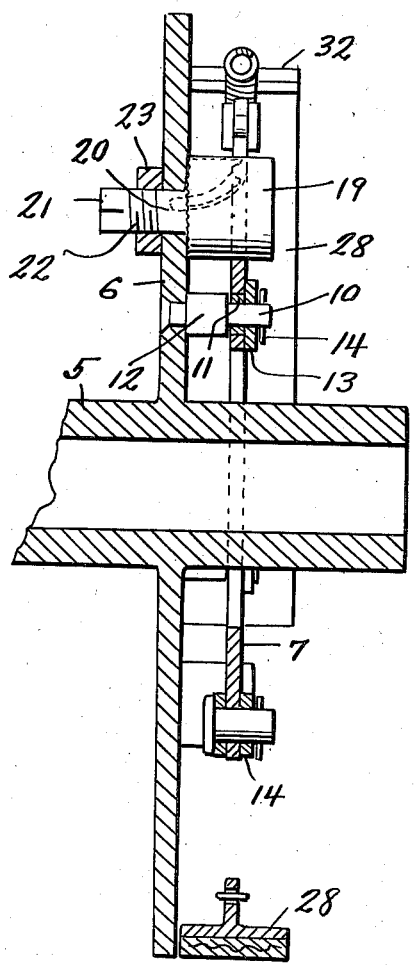
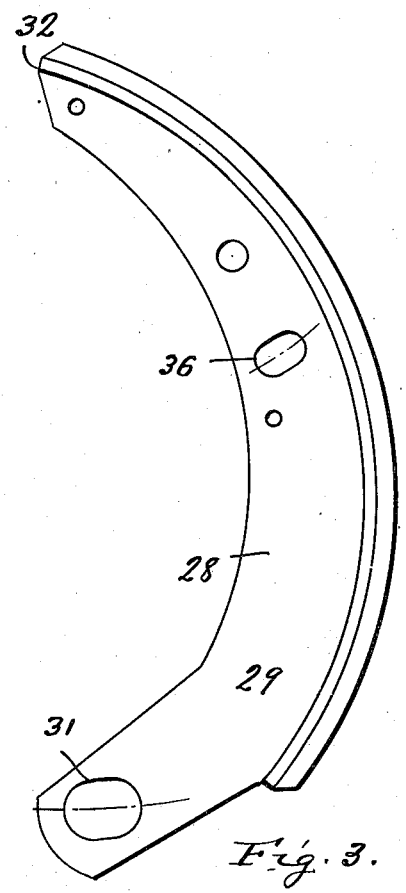
Fig. 3.
Inventor
Otis F. Compton
By Clarence A. O'Brien
Hyman Berman
Attorneys Patented Mar. 22, 1938

2,111,755

UNITED STATES PATENT OFFICE 2,111,755

BRAKE

Otis F. Compton, Nebraska City, Nebr.

Application December 29, 1936, Serial No. 118,131

2 Claims. (Cl. 188—106)

This invention relates to new and useful improvements in brakes especially adapted for use on automobiles, an important object being to provide a brake construction wherein wear is reduced to a minimum.

Other important objects of the invention reside in the provision of means whereby hydraulic or mechanical brake application is possible in one assembly, to provide quick adjustment means for the various workable parts, to afford safety dual application of brakes through mechanical or hydraulic mechanism, to provide a brake in which either mechanical or hydraulic force can be used optionally, to provide means for equal brake shoe application and uniform wear of brake shoe lining regardless of direction of wheel rotation, and furthermore to provide a brake mechanism which will be positive acting in operation and not susceptible to the ready development of defects.

These and various other important objects and advantages of the invention will become apparent to the reader of the following specification.

In the drawings:—

Figure 2 is a vertical sectional view taken substantially on the line 2—2 of Figure 1.

Figure 3 is a side elevational view of one of the brake shoes.

Figure 1:
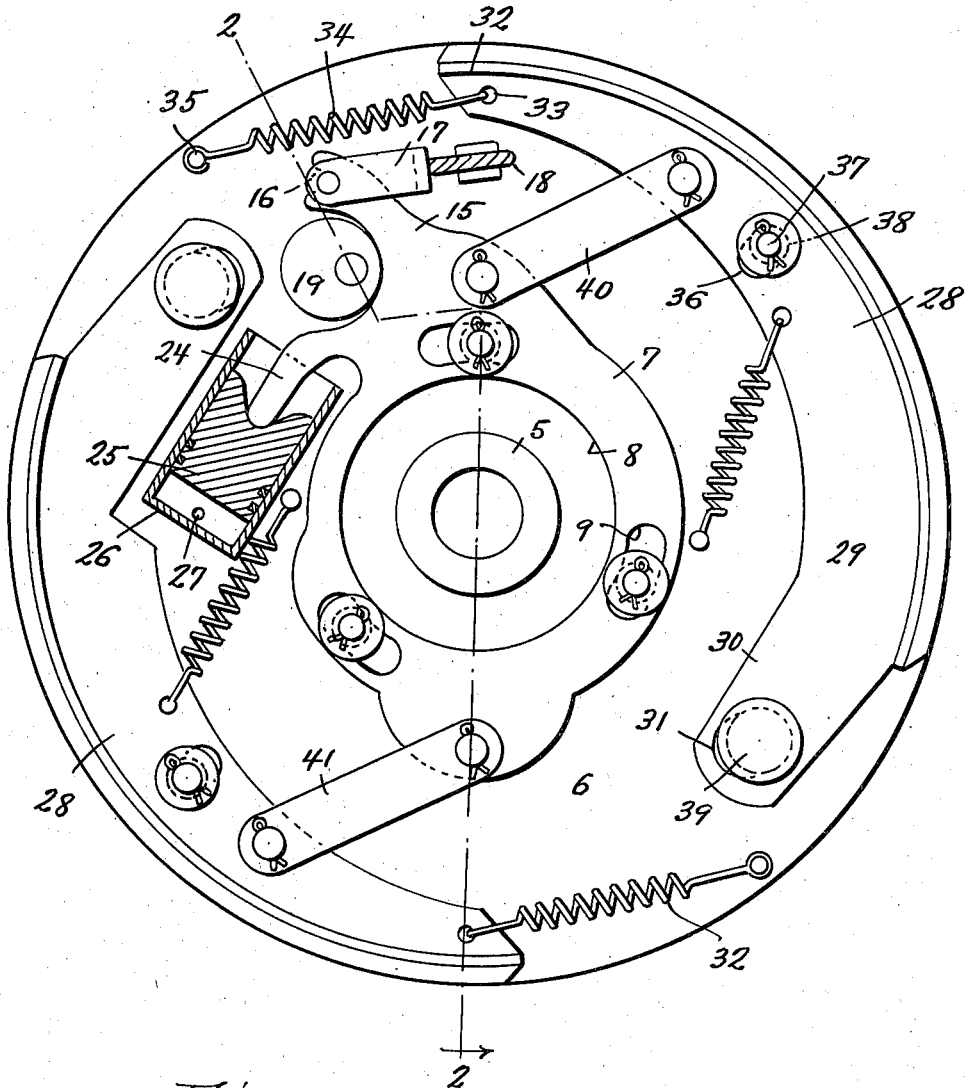
Figure 1 represents a front elevational view of the brake mechanism with the drum removed and showing the service fluid cylinder in section.

Referring to the drawings wherein like numerals designate like parts, it can be seen in Figure 2 that numeral 5 represents one end of an axle from which extends the circumferential brake mechanism carrying plate 6.

An annulus 7 having the oversize opening 8 therein receiving the adjacent end portion of the axle 5 has a plurality of arcuate-shaped slots 9 therein for receiving the pins 10 which project from the plate 6, each of these pins 10 being provided with a roller or other anti-frictional means 11 within the corresponding slot 9. Furthermore, each of the pins 10 has a spaced collar 12 spacing the annulus 7 from the plate 6 and a washer 13 and cotter key 14 can be provided at the outer end of the pins 10.

The upper portion of the annulus 7 as shown in Figure 1 is provided with a forked construction 15, the upper leg portion of which is bifurcated as at 16 to receive the clevis 17 on the adjacent end of a mechanical brake operated cable 18.

Within the crotch of this fork 15 is the cam 19 which has the shank 20 extending through the plate 6, this shank being provided with a polygonal end portion 21 and with threads 22 to accommodate the nut 23. Thus by releasing the nut 23 the cam 19 may be rotated so as to properly adjust the annulus 7.

The other leg of the fork 15 is provided with the extension 24 which is engaged into the depression of the piston 25, the latter being operative within the cylinder 26 having the fluid entrance line 27.

Numerals 28—28 disclose the brake shoes each of which is provided with an enlarged end portion 29 having the reduced extension 30 formed with an oblique slot 31 therein, while the remaining portion of the shoe 28 tapers gradually in an arcuate direction to the reduced end 32 where an opening 33 is located to receive one end of the coiled extensible spring 34 the opposite end being anchored as at 35. The intermediate portion of the shoe 28 is provided with a transverse slot 36 to receive the pin 37 projecting from the wall 6 and this may have a roller 38. A headed stud 39 extends from the plate 6 and through the aforementioned slot 31.

A pivotal link member 40 is interposed between the annulus 7 adjacent the yoke 15 and the adjacent shoe 28 at a point toward the smaller end from the pin 37, while the link 41 has one end connected to the same point on the other shoe while its opposite end connects to the annulus 7 at a point substantially diametrically removed from the connecting point of the link 40.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. In a brake mechanism, the combination with a brake shoe mounting of circular plate like form, and a pair of brake shoes mounted thereon and operative into braking position, of a shoe operating member rotatable on said mounting about the axis thereof and having a tongue like substantially circumferential extension, a pair of links operatively connecting said member on opposite sides of the axis thereof with the shoes, respectively, and hydraulic means for rotating said member including a fluid pressure cylinder, and a piston operative against said extension in the general direction of rotation of said member.

2. In a brake mechanism, the combination with a brake shoe mounting of circular plate like form, and a pair of brake shoes mounted thereon and operative into braking position, of a shoe operating member rotatable on said mounting about the axis thereof, and having a bifurcated end, a pair of links operatively connecting said member on opposite sides of the axis thereof with said shoe, respectively, and selective means for rotating said member comprising a cable connected to one furcation thereof, a fluid pressure cylinder, and a piston in said cylinder movable into abutting relation to the other furcation of said member.

OTIS F. COMPTON